(12) United States Patent
Sugiura et al.

(10) Patent No.: US 11,400,923 B2
(45) Date of Patent: Aug. 2, 2022

(54) INFORMATION PROCESSING DEVICE, VEHICLE CONTROL DEVICE, AND MOBILE OBJECT CONTROL METHOD

(71) Applicant: KABUSHIKI KAISHA TOSHIBA, Tokyo (JP)

(72) Inventors: Takayuki Sugiura, Yokohama Kanagawa (JP); Tomoki Watanabe, Inagi Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 236 days.

(21) Appl. No.: 16/287,777

(22) Filed: Feb. 27, 2019

(65) Prior Publication Data
US 2020/0086857 A1    Mar. 19, 2020

(30) Foreign Application Priority Data

Sep. 18, 2018   (JP) .............................. JP2018-174248

(51) Int. Cl.
*B60W 30/09*   (2012.01)
*G08G 1/16*   (2006.01)
*B60W 30/095*   (2012.01)
*G06V 20/58*   (2022.01)

(52) U.S. Cl.
CPC ........ *B60W 30/09* (2013.01); *B60W 30/0956* (2013.01); *G06V 20/58* (2022.01); *G08G 1/167* (2013.01)

(58) Field of Classification Search
CPC ............. B60W 30/09; B60W 30/0956; B60W 2556/50; B60W 2554/4049; B60W 2554/20; G06K 9/00805; G08G 1/167; G08G 1/165; G06V 20/58
See application file for complete search history.

(56) References Cited

U.S. PATENT DOCUMENTS

| | | | |
|---|---|---|---|
| 8,788,176 B1 * | 7/2014 | Yopp | B60W 30/162 701/96 |
| 9,586,582 B2 | 3/2017 | Nagata | |
| 2012/0323479 A1 * | 12/2012 | Nagata | G08G 1/167 701/301 |
| 2013/0223686 A1 | 8/2013 | Shimizu et al. | |

(Continued)

FOREIGN PATENT DOCUMENTS

| | | |
|---|---|---|
| JP | 2005-173703 A | 6/2005 |
| JP | 2006-213197 A | 8/2006 |

(Continued)

*Primary Examiner* — James J Lee
*Assistant Examiner* — Alexander George Matta
(74) *Attorney, Agent, or Firm* — Knobbe, Martens, Olson & Bear LLP

(57) ABSTRACT

According to an embodiment, an information processing device is used for controlling a mobile object. The device includes one or more hardware processors configured to: generate risk information indicating a level of a risk that is caused when the mobile object moves, based at least in part on a position of an obstacle with respect to the mobile object, the risk being indicated for each of a plurality of areas; and generate condition information indicating a condition for performing a countermeasure operation for a risk in accordance with the risk information.

13 Claims, 11 Drawing Sheets

(56) References Cited

U.S. PATENT DOCUMENTS

| | | | | |
|---|---|---|---|---|
| 2015/0283999 A1* | 10/2015 | Igarashi | ................. | G08G 1/165 |
| | | | | 701/1 |
| 2018/0231974 A1* | 8/2018 | Eggert | ................ | B60W 30/085 |
| 2018/0237006 A1* | 8/2018 | Ishii | .................. | B60W 50/0225 |
| 2019/0333386 A1* | 10/2019 | Horita | ............... | B60W 30/0956 |
| 2020/0086863 A1* | 3/2020 | Rosman | ................ | B60W 30/09 |

FOREIGN PATENT DOCUMENTS

| | | |
|---|---|---|
| JP | 2007-257338 A | 10/2007 |
| JP | 2011-198266 A | 10/2011 |
| JP | 2012-104029 A | 5/2012 |
| JP | 5981237 | 1/2014 |
| WO | WO 2012/033173 A1 | 3/2012 |

* cited by examiner

INFORMATION PROCESSING DEVICE, VEHICLE CONTROL DEVICE, AND MOBILE OBJECT CONTROL METHOD

CROSS-REFERENCE TO RELATED APPLICATIONS

This application is based upon and claims the benefit of priority from Japanese Patent Application No. 2018-174248, filed on Sep. 18, 2018; the entire contents of which are incorporated herein by reference.

FIELD

Embodiments described herein relate generally to an information processing device, a vehicle control device, and a mobile object control method.

BACKGROUND

It is desirable that an automatic driving system of a vehicle and a driving support system of a vehicle can predict an object and the like running out from a blind spot region the state of which cannot be directly detected by a sensor, and can avoid a minor collision between the vehicle and the object. For example, when detecting a blind spot region, these systems decelerate the vehicle to avoid a minor collision between the vehicle and the object. However, in a case in which the vehicle is uniformly decelerated for all detected blind spot regions, the vehicle may be repeatedly decelerated and accelerated within a short period, and may travel unnaturally.

DETAILED DESCRIPTION

According to an embodiment, an information processing device is used for controlling a mobile object. The device includes one or more hardware processors configured to: generate risk information indicating a level of a risk that is caused when the mobile object moves, based at least in part on a position of an obstacle with respect to the mobile object, the risk being indicated for each of a plurality of areas; and generate condition information indicating a condition for performing a countermeasure operation for a risk in accordance with the risk information.

The following describes an embodiment with reference to the attached drawings. An information processing device 20 according to the present embodiment is used for controlling a mobile object. Specifically, the information processing device 20 is used for control for previously performing a countermeasure operation (for example, deceleration, changing a moving direction, outputting a warning sound, or the like) for a risk that is caused when the mobile object moves (for example, possibility of a minor collision between the mobile object and another object).

In the present embodiment, the mobile object is a vehicle 10. However, the mobile object is not limited to the vehicle 10, and may be a robot, for example. The mobile object may be a flyable object such as a drone, or an object that moves on a water surface such as a ship.

Figure 1:
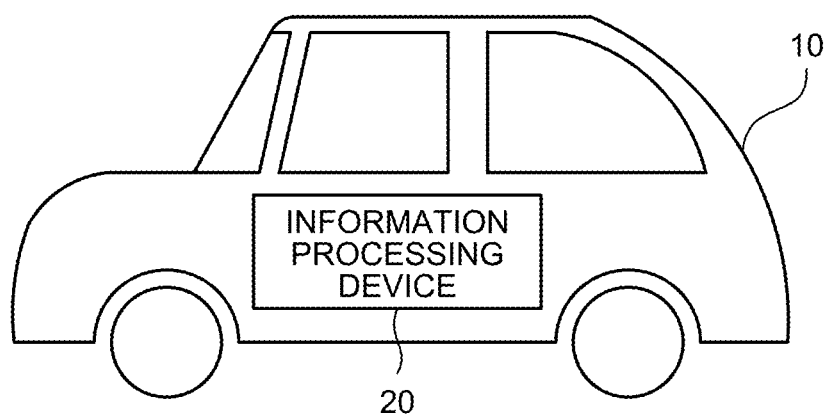
FIG. 1 is a diagram illustrating a vehicle 10 according to an embodiment.

FIG. 1 is a diagram illustrating the vehicle 10 according to the embodiment. The vehicle 10 is equipped with the information processing device 20. The information processing device 20 is a device including, for example, a dedicated computer or a general-purpose computer. An information processing function of the information processing device 20 may be mounted on another device such as a cloud without being mounted on the vehicle 10. The vehicle 10 may be, for example, a normal vehicle that travels via a driving operation performed by a person, or an automatic driving vehicle that can automatically travel (that can autonomously travel) without a driving operation performed by a person.

Figure 2:
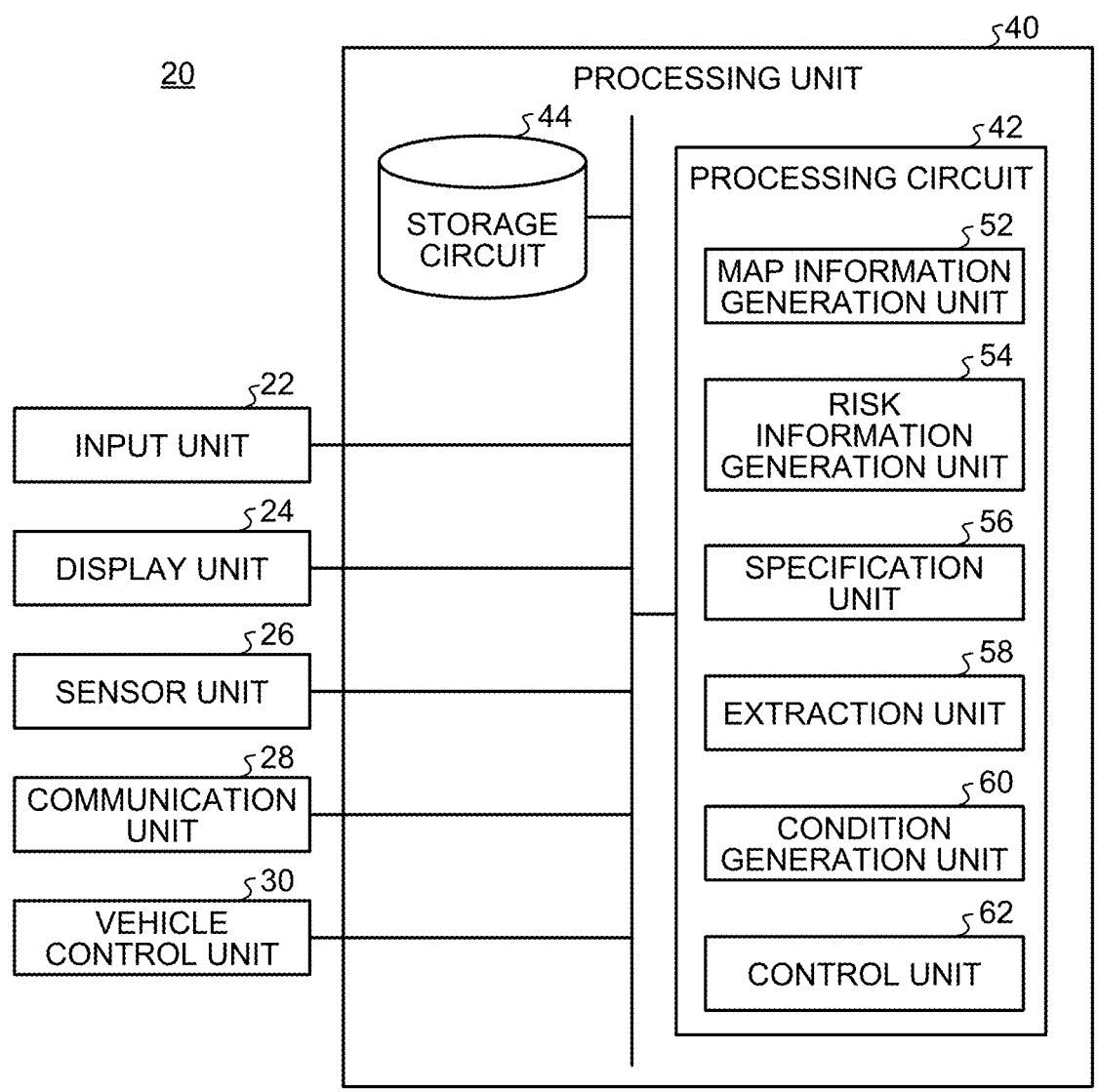
FIG. 2 is a diagram illustrating an example of a configuration of an information processing device 20.

FIG. 2 is a diagram illustrating an example of a configuration of the information processing device 20 according to the embodiment. The information processing device 20 includes an input unit 22, a display unit 24, a sensor unit 26, a communication unit 28, a vehicle control unit 30, and a processing unit 40.

The input unit 22 receives an instruction and information input by a user. The input unit 22 is, for example, an operation panel, a pointing device such as a mouse or a trackball, or an input device such as a keyboard.

The display unit 24 displays various pieces of information. The display unit 24 is, for example, a display device such as a liquid crystal display.

The sensor unit 26 includes one or a plurality of sensors that detect a surrounding situation of the vehicle 10. For example, the sensor unit 26 includes a sensor that detects a position of an obstacle on the periphery of the vehicle 10. For example, the sensor unit 26 includes a distance sensor (LiDAR) that detects a position of an object that is present on a plane that is horizontal to a road surface on which the vehicle 10 moves and is at a predetermined height from the road surface. For example, the distance sensor emits a laser beam at a predetermined height from the road surface and horizontally to the road surface in a range of all directions from the vehicle 10 (for example, a range of 360°) or a range of a predetermined angle including a traveling direction of the vehicle 10 (for example, a range of 180°). The distance sensor detects reflected light of the laser beam for the respective directions, and detects a distance to an object that reflects the laser beam based on the detected reflected light. Due to this, the sensor unit 26 can detect the position of the obstacle on the periphery of the vehicle 10. The distance sensor may use not only one line of laser beam at a predetermined height from the road surface but also a plurality of lines of laser beam that are horizontally emitted at a plurality of heights.

The sensor unit 26 may include sonar that detects a distance to a surrounding object using sound waves. For example, the sensor unit 26 may include a stereo camera that takes a stereo image that can acquire a distance to a surrounding object. The sensor unit 26 may include other sensors for detecting a position, speed, acceleration, angular speed, and the like of a surrounding object (for example, another vehicle).

The communication unit 28 is an interface that transmits/receives information to/from an external device via wireless communication, for example. The communication unit 28 may acquire a detection result of a position of an obstacle on the periphery of the vehicle 10 obtained by an external sensor of the vehicle 10. The communication unit 28 may acquire image data from a camera and the like that photograph an intersecting point, a road, and the like from above. The communication unit 28 may communicate with another vehicle, a roadside machine, and the like in a wireless manner. The communication unit 28 may access a server and the like via a network.

The vehicle control unit 30 controls a driving mechanism for driving the vehicle 10. For example, in a case in which the vehicle 10 is an automatic driving vehicle, the vehicle control unit 30 determines a surrounding situation based on the information obtained from the sensor unit 26 and other information, and controls an accelerator quantity, a brake quantity, a steering angle, and the like. In a case in which the vehicle 10 is a normal vehicle that travels via a driving operation performed by a person, the vehicle control unit 30 controls an accelerator quantity, a brake quantity, a steering angle, and the like in accordance with operation information.

The processing unit 40 is, for example, a dedicated computer or a general-purpose computer. The processing unit 40 manages and controls the input unit 22, the display unit 24, the sensor unit 26, the communication unit 28, and the vehicle control unit 30.

The processing unit 40 includes a processing circuit 42 and a storage circuit 44. The processing circuit 42 and the storage circuit 44 are connected to each other via a bus. The processing circuit 42 is, for example, connected to the input unit 22, the display unit 24, the sensor unit 26, the communication unit 28, and the vehicle control unit 30 via the bus.

The processing circuit 42 is, for example, one or a plurality of processors, and reads out and executes a program from the storage circuit 44 to implement a function corresponding to the program.

In the present embodiment, the processing circuit 42 executes a countermeasure program that causes the vehicle 10 to perform a countermeasure operation in advance for a risk that is caused when the vehicle 10 moves. The processing circuit 42 in a state of reading out and executing the countermeasure program includes respective components illustrated in the processing circuit 42 in FIG. 2. That is, by executing the countermeasure program, the processing circuit 42 functions as a map information generation unit 52, a risk information generation unit 54, a specification unit 56, an extraction unit 58, a condition generation unit 60, and a control unit 62. Details about these components will be described later.

The processor reads out and executes the program stored in the storage circuit 44 to implement the function. In place of storing the program in the storage circuit 44, the processor may be configured to directly incorporate the program into a circuit of the processor. In this case, the processor reads out and executes the program incorporated in the circuit to implement the function.

The storage circuit 44 stores a program for causing the processing circuit 42 to function as the map information generation unit 52, the risk information generation unit 54, the specification unit 56, the extraction unit 58, the condition generation unit 60, and the control unit 62. The storage circuit 44 stores data and the like corresponding to processing performed by the processing circuit 42 as needed.

For example, the storage circuit 44 is a semiconductor memory element such as a random access memory (RAM) and a flash memory, a hard disk, an optical disc, and the like. Part or all of the functions of the storage circuit 44 may be implemented by an external storage device of the processing unit 40. The storage circuit 44 may be a storage medium that stores or temporarily stores a downloaded program that is transmitted via a local area network (LAN), Internet, and the like. The storage circuit 44 may be constituted of one storage medium, or may be constituted of a plurality of storage media. The storage circuit 44 may also be constituted of a plurality of types of storage media.

Figure 3:
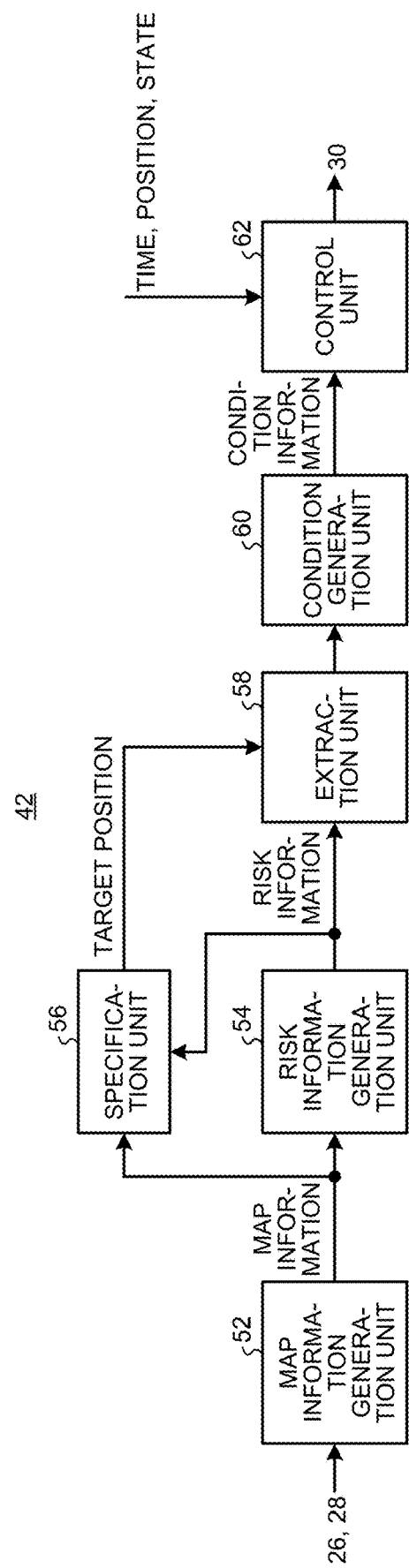
FIG. 3 is a diagram illustrating a functional configuration of a processing circuit 42.

FIG. 3 is a diagram illustrating a functional configuration of the processing circuit 42. The processing circuit 42 that has executed the countermeasure program includes the map information generation unit 52, the risk information generation unit 54, the specification unit 56, the extraction unit 58, the condition generation unit 60, and the control unit 62.

The map information generation unit 52 generates map information based on observation information observed by the sensor unit 26 and observation information acquired from the communication unit 28. The map information indicates information for identifying an obstacle region representing a position of the obstacle on the periphery of the vehicle 10, a line-of-sight region that is not hidden by the obstacle when viewed from the vehicle 10, or a blind spot region that is present within or behind the obstacle when viewed from the vehicle 10, for each position on the periphery of the vehicle 10.

The risk information generation unit 54 generates risk information indicating a level of a risk that is caused when the vehicle 10 moves based on the position of the obstacle on the periphery of the vehicle 10, for each position on the periphery of the vehicle 10. For example, the risk information generation unit 54 generates the risk information for each position on the periphery of the vehicle 10 based on the map information. By way of example, the risk is a possibility that the object runs out from the blind spot region to have a minor collision with the vehicle 10. In this case, for example, the risk information generation unit 54 estimates an obstacle presence probability for each blind spot region. The object that will run out may be hidden with higher possibility at a position having a smaller obstacle presence probability that is estimated, so that the risk information generation unit 54 generates the risk information indicating a high risk for that position.

The specification unit 56 specifies a target position at which a risk for which the vehicle 10 needs to perform the countermeasure operation may be caused on the periphery of the vehicle 10. For example, the specification unit 56 analyzes the map information using a predetermined algorithm to specify the target position. For example, the specification unit 56 specifies, as the target position, a position in the blind spot region having a risk at a predetermined level or higher, the position being adjacent to the line-of-sight region that is not hidden by the obstacle when viewed from the vehicle 10.

The specification unit 56 may specify, as the target region, a position at which the level of the risk is equal to or higher than a threshold. The specification unit 56 may specify, as the target position, a position designated by a driver (user). The specification unit 56 may also specify a plurality of target positions on the periphery of the vehicle 10.

The extraction unit 58 extracts the risk information of the target position from the risk information for each position generated by the risk information generation unit 54. In a case in which a plurality of target positions are specified, the extraction unit 58 extracts the risk information for each of the target positions.

The condition generation unit 60 generates condition information indicating a condition for performing the countermeasure operation for a risk in accordance with the risk information of the target position. In a case of extracting a plurality of target positions, the condition generation unit 60 generates the condition information for each of the target positions.

The condition generation unit 60 generates condition information indicating a time at which the vehicle 10 performs the countermeasure operation. In this case, the condition generation unit 60 generates the condition information for causing the countermeasure operation to be performed at an earlier time as the level of the risk is higher.

The condition generation unit 60 may also generate condition information indicating a position of the vehicle 10 at which the vehicle 10 performs the countermeasure operation. In this case, the condition generation unit 60 generates the condition information for causing the countermeasure operation to be performed at a position farther from the target position as the level of the risk is higher.

The control unit 62 receives the condition information from the condition generation unit 60. The control unit 62 also receives a current time, a current position of the vehicle 10, and a current state of the vehicle 10 (for example, speed, a state of a steering wheel, and the like). The control unit 62 determines whether the condition indicated by the condition information is met. If the condition is met, the control unit 62 causes the vehicle 10 to perform the countermeasure operation.

For example, in a case in which the condition information indicates the time at which the countermeasure operation is performed, and the current time is identical to the time indicated by the condition information, the control unit 62 gives, to the vehicle control unit 30, an instruction to perform the countermeasure operation. In a case in which the condition information indicates the position at which the countermeasure operation is performed, and the current position of the vehicle 10 is identical to the position indicated by the condition information, the control unit 62 gives, to the vehicle control unit 30, an instruction to perform the countermeasure operation.

The countermeasure operation is, for example, an operation of decelerating the vehicle 10. For example, if the condition is met, the control unit 62 gives, to the vehicle control unit 30, an instruction to decelerate the vehicle 10. The countermeasure operation is, for example, an operation of changing a moving direction of the vehicle 10. For example, if the condition is met, the control unit 62 gives, to the vehicle control unit 30, an instruction to change the moving direction of the vehicle 10. The countermeasure operation may also be an operation of generating a warning sound, or an operation of displaying information for warning the driver (user) of danger.

Figure 4:
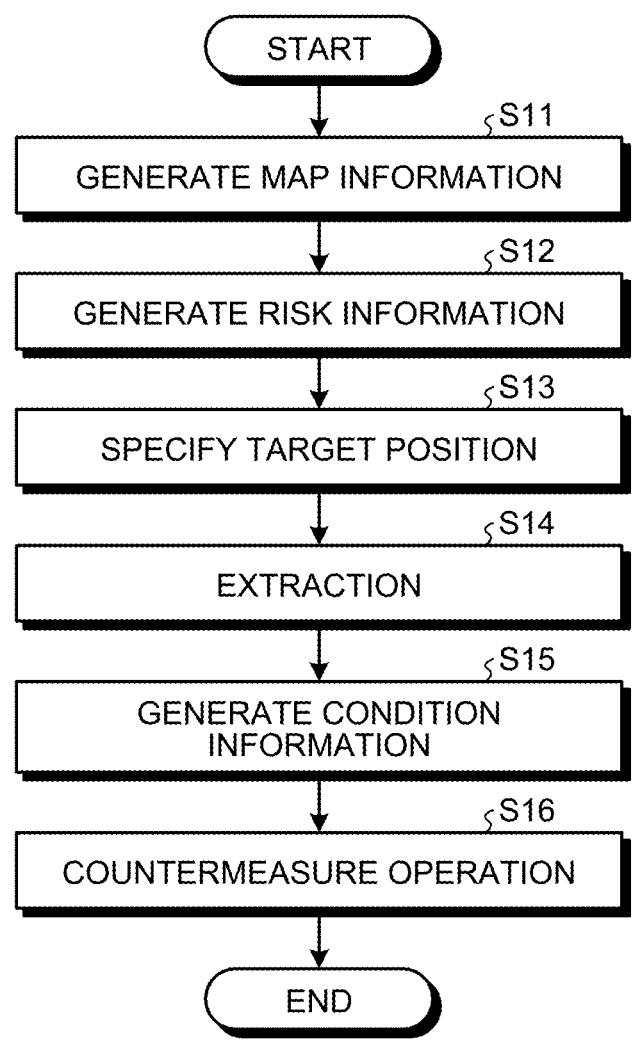
FIG. 4 is a flowchart illustrating a processing procedure of the processing circuit 42.

FIG. 4 is a flowchart illustrating a processing procedure of the processing circuit 42 according to the embodiment. The following describes processing performed by the processing circuit 42 with reference to FIG. 5, FIG. 6, FIG. 7, and FIG. 8.

First, at S11, the map information generation unit 52 generates the map information. In the present embodiment, the map information generation unit 52 generates the map information based on the observation information observed by the sensor unit 26 and the observation information acquired from the communication unit 28.

The map information indicates information for identifying the obstacle region, the line-of-sight region, or the blind spot region for each position on the periphery of the vehicle 10. The periphery of the vehicle 10 is, for example, a range at a predetermined distance (for example, 100 m) from the vehicle 10 in all directions around the vehicle 10 (for example, a range of 360° around the vehicle 10). The periphery of the vehicle 10 may be a range at a predetermined distance (for example, 100 m) from the vehicle 10 in a predetermined angle range (for example, an angle range of 180° in front of the vehicle 10) on a traveling direction side of the vehicle 10.

The obstacle region is a region in which the obstacle is present. The map information can indicate the position of the obstacle on the periphery of the vehicle 10 as the obstacle region.

The line-of-sight region is a region that is not hidden by the obstacle in which the obstacle is not present when viewed from the vehicle 10. That is, the line-of-sight region is a region from the vehicle 10 to the obstacle in the respective directions. The map information can indicate a region having no risk caused by the obstacle as the line-of-sight region.

The blind spot region is a region that is caused to be a blind spot by the obstacle, and the vehicle 10 cannot acquire presence of the object and the state of the region therein. For example, the blind spot region is a region that is present within or behind the obstacle when viewed from the vehicle 10. The map information can indicate a region possibly having a risk as the blind spot region.

The map information generation unit 52 detects, for example, the obstacle region, the line-of-sight region, and the blind spot region based on a relative relation between the position of the obstacle detected by the sensor unit 26 and the position of the vehicle 10.

Figure 5:
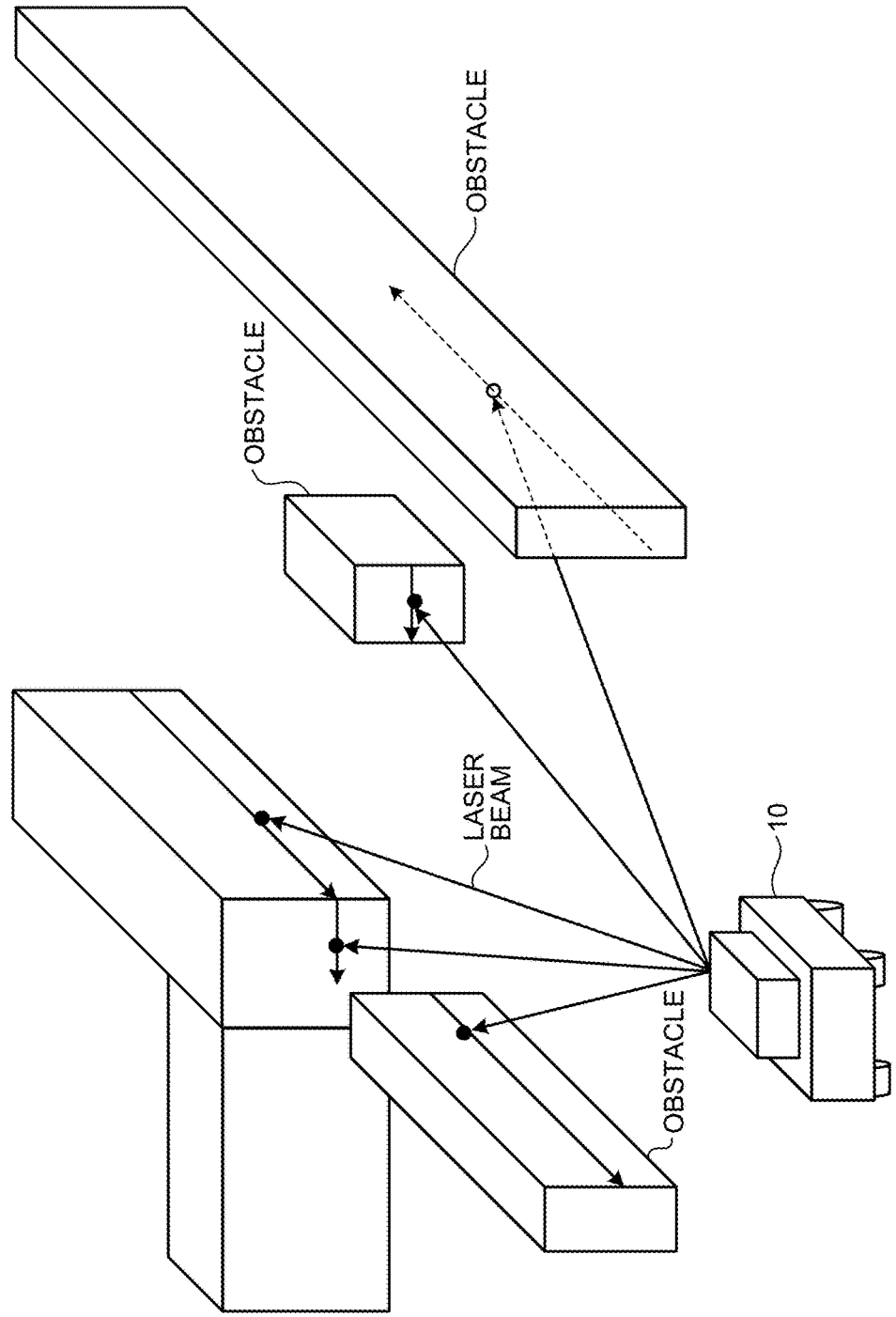
FIG. 5 is a schematic diagram illustrating an example of the vehicle 10 and a surrounding situation.

As illustrated in FIG. 5, for example, the sensor unit 26 includes the distance sensor (LiDAR). The map information generation unit 52 acquires a distance from the vehicle 10 to the obstacle in all directions (or in a predetermined angle range) based on such an observation result of the sensor unit 26. The map information generation unit 52 calculates a position of the obstacle region based on such distance information to the obstacle in each direction. The map information generation unit 52 assumes a region from the vehicle 10 to the obstacle to be the line-of-sight region, and assumes a region behind the obstacle viewed from the vehicle 10 to be the blind spot region for each direction.

The map information generation unit 52 may generate the map information using observation results of a plurality of lines of distance sensors in place of or in addition to the observation result of a line of distance sensor. The map information generation unit 52 may generate the map information using an observation result of another sensor such as a stereo camera, or may generate the map information by acquiring an observation result of a sensor such as an external camera and the like of the vehicle 10 from the communication unit 28. For example, the map information generation unit 52 may specify the blind spot region based on map data that is acquired via a network to be reflected in the map information.

Figure 6:
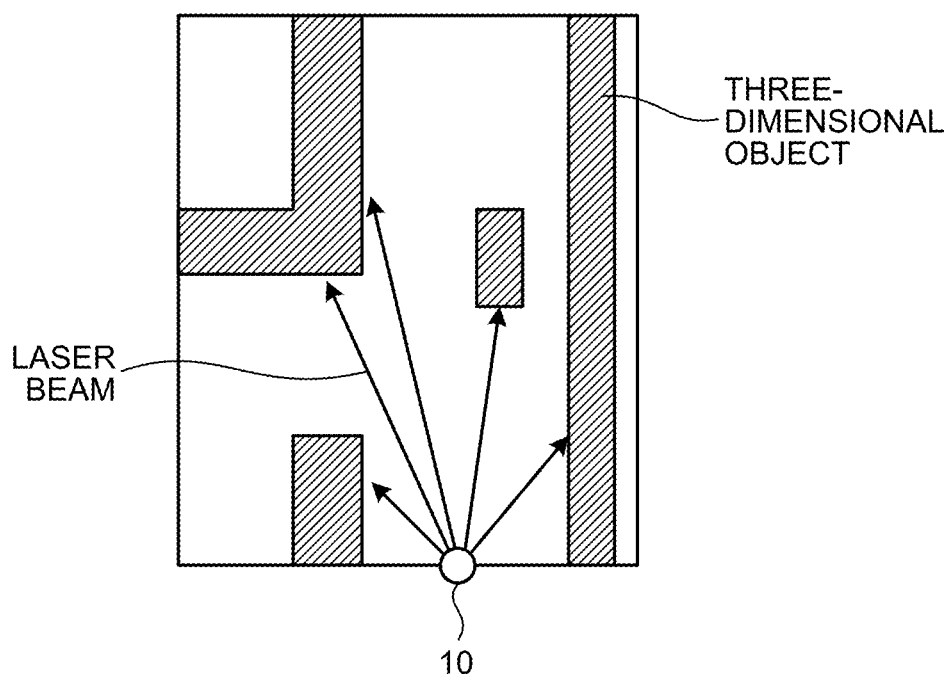
FIG. 6 is a top view of a periphery of the vehicle 10.
Figure 7:
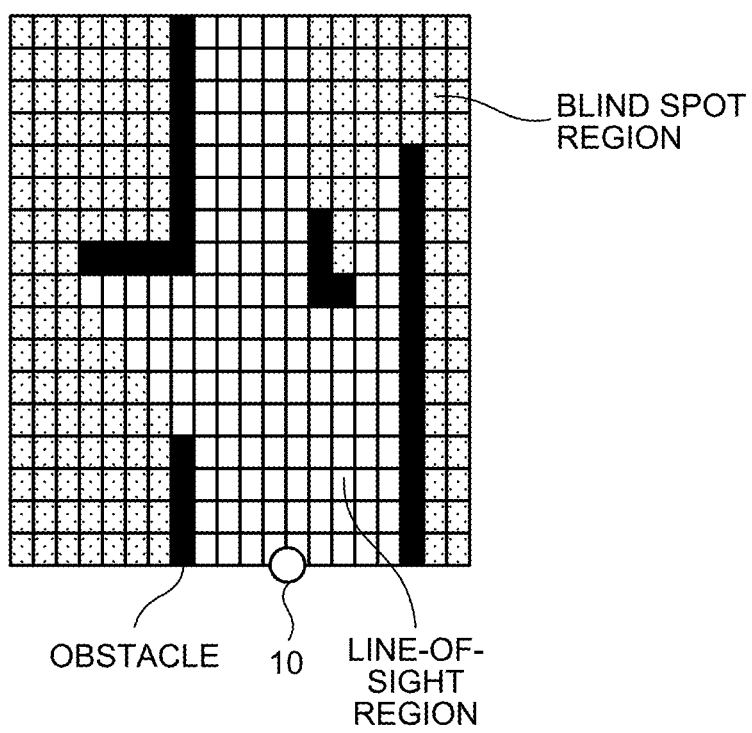
FIG. 7 is a diagram illustrating an example of map information.

For example, the periphery of the vehicle 10 viewed from above is assumed to be as illustrated in FIG. 6. In this case, for example, the map information generation unit 52 generates the map information as two-dimensional data as illustrated in FIG. 7. In the map information as the two-dimensional data, coordinates of each dot indicate each position on the periphery of the vehicle 10. In the map information as the two-dimensional data, a data value of each dot indicates a region type (the obstacle region, the line-of-sight region, or the blind spot region).

The map information is not limited to two-dimensional image data, and may be, for example, a data set including a plurality of sets of the distance from the vehicle 10, the direction (angle), and the region type (the line-of-sight region, the blind spot region, or the obstacle region). The map information may be data representing a shape, a distance, and a direction for each obstacle.

Additionally, the map information generation unit 52 may determine an attribute of the obstacle. For example, the map information generation unit 52 may determine the attribute representing whether the obstacle is another vehicle, a guardrail, or a pedestrian, for example, based on an image taken by a camera and the like. In this case, the map information includes data representing the attribute of the obstacle.

The map information generation unit 52 may also determine the attribute of the line-of-sight region. For example, the map information generation unit 52 may determine the attribute representing whether the line-of-sight region is a region in which the vehicle 10 can travel based on map data acquired via a network and the like. For example, the map information generation unit 52 may determine whether the line-of-sight region is a roadway or a footpath. In this case, the map information also includes data representing the attribute of the line-of-sight region.

Subsequently, at S12, the risk information generation unit 54 generates the risk information indicating the level of the risk that is caused when the vehicle 10 moves for each position on the periphery of the vehicle 10 based on the map information.

By way of example, the risk is a possibility that the object runs out from the blind spot region to have a minor collision with the vehicle 10. In this case, the risk information generation unit 54 assumes a degree of possibility that the object is present in the blind spot region to be the level of the risk. For example, the risk information generation unit 54 divides the blind spot region into small regions (for example, a range of 1 square meter or 0.5 square meters), and estimates a probability that the obstacle such as a building or a land fixture is present in each of the small regions.

For example, the risk information generation unit 54 estimates the obstacle presence probability for each of the small regions by giving the map information to a pre-trained model such as a convolutional neural network (CNN). The pre-trained model is previously trained by using a large number of pairs of the map information and teacher information (presence information of the obstacle for each small region at an actual place where the map information is obtained).

In the blind spot region, as the obstacle presence probability is lower, that is, as the probability that the region is flat (probability that the region is a plane having the same height as that of the road surface) is higher, a probability that a person or another movable object is hidden is higher. That is, in the blind spot region, the object may run out to have a minor collision with the vehicle 10 with higher possibility as the obstacle presence probability is lower. Thus, the risk information generation unit 54 generates the risk information indicating a higher risk as the obstacle presence probability is lower for each small region.

The risk information generation unit 54 may calculate the level of the risk for each position using another method in place of or in addition to such information. For example, the risk information generation unit 54 may estimate environment of each position, and may change the level of the risk in accordance with the estimated environment. For example, the risk information generation unit 54 estimates whether each position is an entrance of a park or a building where many people go in and go out, and increases the risk for a position that is an entrance of a park or a building. In this case, the risk information generation unit 54 determines whether each position is a predetermined environment such as an entrance of a park or a building by comparing the observation result of the sensor unit 26 with a template held in advance. The risk information generation unit 54 may determine whether each position is the predetermined environment with reference to map data and the like.

In a case in which a possibility of movement of the object present in the blind spot region can be estimated based on information other than the information from the sensor unit 26, the risk information generation unit 54 may change the level of the risk based on the estimated information. For example, in a case in which it is estimated that the object present in the blind spot region moves to a scheduled movement position of the vehicle 10 with high possibility, the risk information generation unit 54 increases the risk.

The risk information generation unit 54 generates the risk information representing the level of the risk as a continuous value. The risk information generation unit 54 may generate the risk information representing the level of a risk as a discrete value of a predetermined stage.

The risk information generation unit 54 may further determine content of the risk in addition to the level of the risk for each position on the periphery of the vehicle 10 to be added to the risk information. Additionally, the risk information generation unit 54 may add information indicating the environment of the position to the risk information for each position on the periphery of the vehicle 10.

Subsequently, at S13, the specification unit 56 specifies, a target position on the periphery of the vehicle 10 at which a risk on which the countermeasure operation needs to be performed by the vehicle 10 may be caused. For example, the specification unit 56 may analyze the map information using a predetermined algorithm to specify the target position. The specification unit 56 may specify, as the target position, a position having the level of the risk equal to or higher than a threshold. The specification unit 56 may specify a plurality of target positions on the periphery of the vehicle 10.

Figure 8:
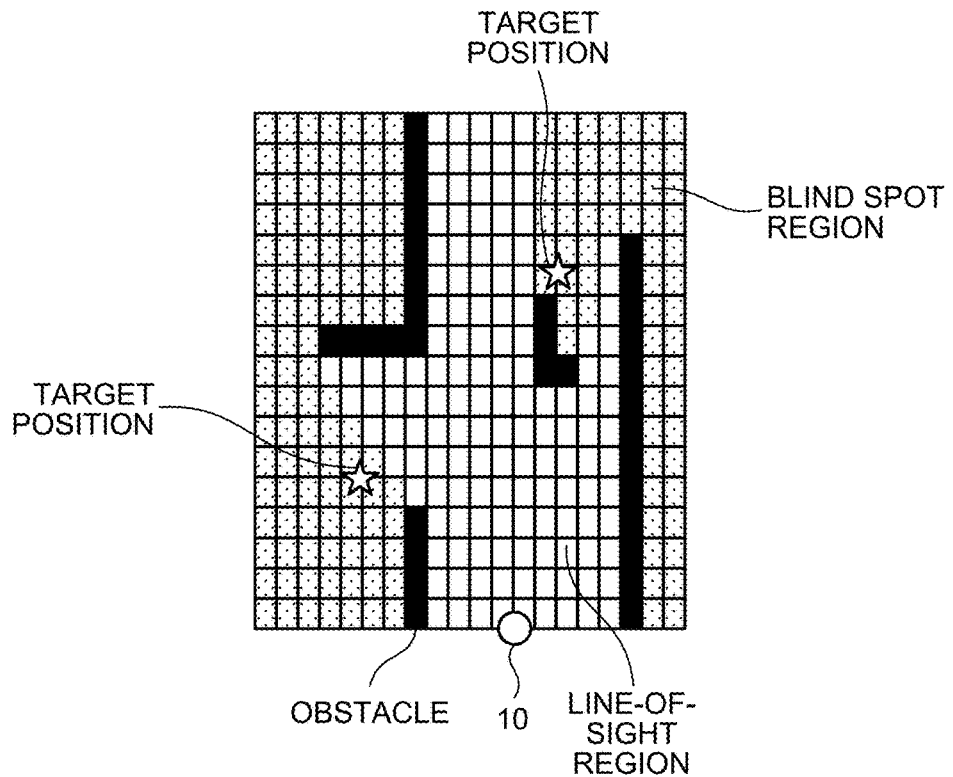
FIG. 8 is a diagram illustrating an example of the map information and a target position.

For example, as illustrated in FIG. 8, the specification unit 56 specifies, as the target position, a position in the blind spot region having a risk at a predetermined level or higher, the position being adjacent to the line-of-sight region on the traveling direction side of the vehicle 10 (for example, the blind spot region adjacent to a right side boundary or a left side boundary of the line-of-sight region).

The specification unit 56 may specify the target position using the attribute of the obstacle region or the attribute of the line-of-sight region. For example, in a case in which another stopping vehicle is present, the specification unit 56 may specify the blind spot region in the rear of the stopping vehicle as the target position. The specification unit 56 may specify, as the target position, an inner part of a certain building adjacent to a route on which the vehicle 10 travels. In a case in which the blind spot region occupies an area having a predetermined size or more of an area having a size defined in advance, the specification unit 56 may specify the blind spot region as the target position.

In a case in which a relative position that is defined with respect to the vehicle 10 in advance is included in the blind spot region, the specification unit 56 may specify the relative position as the target position. More specifically, for example, on the condition that a position at an angle of 45° in a left forward direction with respect to the vehicle 10 and at a distance of 10 to 30 m from the vehicle 10 is included in the blind spot region, the specification unit 56 may specify the position as the target position.

The specification unit 56 may specify the target position in accordance with a distance from the vehicle 10. For example, on the condition that a position is in a range at a predetermined distance from the vehicle 10, the specification unit 56 may specify the position as the target position. The specification unit 56 may specify a position designated by the driver (user) as the target position.

Subsequently, at S14, the extraction unit 58 extracts risk information of the target position from the risk information for each position generated at S12. In a case in which a plurality of target positions are specified, the extraction unit 58 extracts the risk information for each of the target positions.

Subsequently, at S15, the condition generation unit 60 generates condition information indicating a condition for performing the countermeasure operation for the risk in accordance with the extracted risk information of the target position. In a case of extracting a plurality of target positions, the condition generation unit 60 generates the condition information for each of the target positions.

For example, the condition generation unit 60 generates condition information indicating a time at which the vehicle 10 performs the countermeasure operation. In this case, for example, the condition generation unit 60 generates the condition information for causing the countermeasure operation to be performed at an earlier time as the level of the risk is higher.

The condition generation unit 60 may generate condition information indicating the position of the vehicle 10 at which the vehicle 10 performs the countermeasure operation. In this case, for example, the condition generation unit 60 generates condition information for causing the countermeasure operation to be performed at a position farther from the target position as the level of the risk is higher.

Accordingly, the condition generation unit 60 can generate condition information for causing the countermeasure operation to be performed after the vehicle 10 comes closer to the target position in a case in which the risk at the target position is low. The condition generation unit 60 can generate condition information for causing the vehicle 10 to perform the countermeasure operation at a position sufficiently far from the target position in a case in which the risk at the target position is high.

Subsequently, at S16, the control unit 62 gives a control instruction to the vehicle control unit 30 in accordance with the condition information generated at S15.

Figure 9:
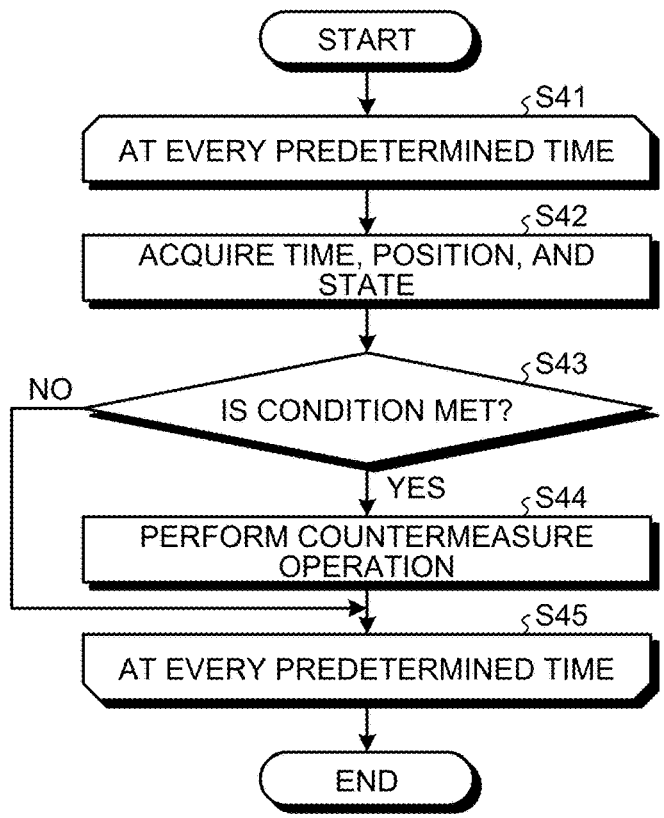
FIG. 9 is a flowchart illustrating a processing procedure of a control unit 62.

FIG. 9 is a flowchart illustrating a processing procedure of the control unit 62. The control unit 62 performs processing illustrated in FIG. 9 at S16 in FIG. 4.

The control unit 62 repeatedly performs the processing at S42 to S44 at every predetermined time (loop processing between S41 and S45).

At S42, the control unit 62 acquires a current time, a current position of the vehicle 10, and a current state of the vehicle 10. Subsequently, at S43, the control unit 62 determines whether the condition indicated by the condition information is met.

For example, in a case in which the condition information indicates a time (countermeasure time) at which the countermeasure operation is to be performed, the control unit 62 determines whether the current time is the countermeasure time. In a case in which the condition information indicates a position (countermeasure position) at which the countermeasure operation is to be performed, the control unit 62 determines whether the current position is the countermeasure position.

If the condition indicated by the condition information is not met (No at S43), the control unit 62 does not perform the process and returns the process to S41. If the condition indicated by the condition information is met (Yes at S43), the control unit 62 advances the process to S44.

At S44, the control unit 62 causes the vehicle 10 to perform the countermeasure operation. Specifically, the control unit 62 gives, to the vehicle control unit 30, an instruction to perform the countermeasure operation. When the process at S44 ends, the control unit 62 returns the process to S41.

By performing such a process, the control unit 62 can determine whether the condition indicated by the condition information is met, and if the condition is met, the control unit 62 can cause the vehicle 10 to perform the countermeasure operation.

For example, if the condition is met, the control unit 62 gives, to the vehicle control unit 30, an instruction to decelerate the vehicle 10. For example, if the condition is met, the control unit 62 gives, to the vehicle control unit 30, an instruction to change the moving direction of the vehicle 10. For example, if the condition is met, the control unit 62 may give an instruction to generate a warning sound, or may give an instruction to notify the driver (user) of information for warning of danger.

In a case in which the condition information indicates the content of the risk, the control unit 62 may cause different countermeasure operations to be performed depending on the content of the risk. In a case in which the condition information indicates the target position, the attribute of the target position, or the like, the control unit 62 may cause different countermeasure operations to be performed depending on the target position or the attribute. For example, the control unit 62 may cause the countermeasure operation of moving the vehicle 10 to the left side to be performed in a case in which the target position is present on the right side of the vehicle 10, and may cause the countermeasure operation of moving the vehicle 10 to the right side in a case in which the target position is present on the left side of the vehicle 10.

As described above, the information processing device 20 according to the present embodiment performs the countermeasure operation such as deceleration or changing the moving direction of the vehicle 10 in advance for the risk that is caused when the vehicle 10 moves. For example, the information processing device 20 according to the present embodiment performs the countermeasure operation at a position farther from a position having the risk in a case in which the risk is relatively high, and performs the countermeasure operation at a position relatively close to a position having the risk in a case in which the risk is relatively low.

Accordingly, the information processing device 20 according to the present embodiment can perform the countermeasure operation at an appropriate timing in accordance with the level of the risk. Thus, the vehicle 10 controlled by the information processing device 20 can travel naturally as much as possible while securely performing the countermeasure operation for the risk.

In the present embodiment, the information processing device 20 detects, as the risk, the possibility that the object runs out from the blind spot region to have a minor collision with the vehicle 10. The risk is not limited thereto, and may be any other possibility that is caused when the vehicle 10 moves. For example, the risk may be a possibility that traffic lights, a sign, a signboard, and the like are present in the blind spot region. This is because, in a case in which traffic lights, a sign, a signboard, and the like suddenly appear, the vehicle 10 needs to abruptly change the moving direction, for example. In a case of this risk, for example, the information processing device 20 estimates a curvature of the road in the blind spot region, and generates the risk information indicating a higher risk as the estimated curvature of the road is larger.

Modification

Next, the following describes a first modification.

Figure 10:
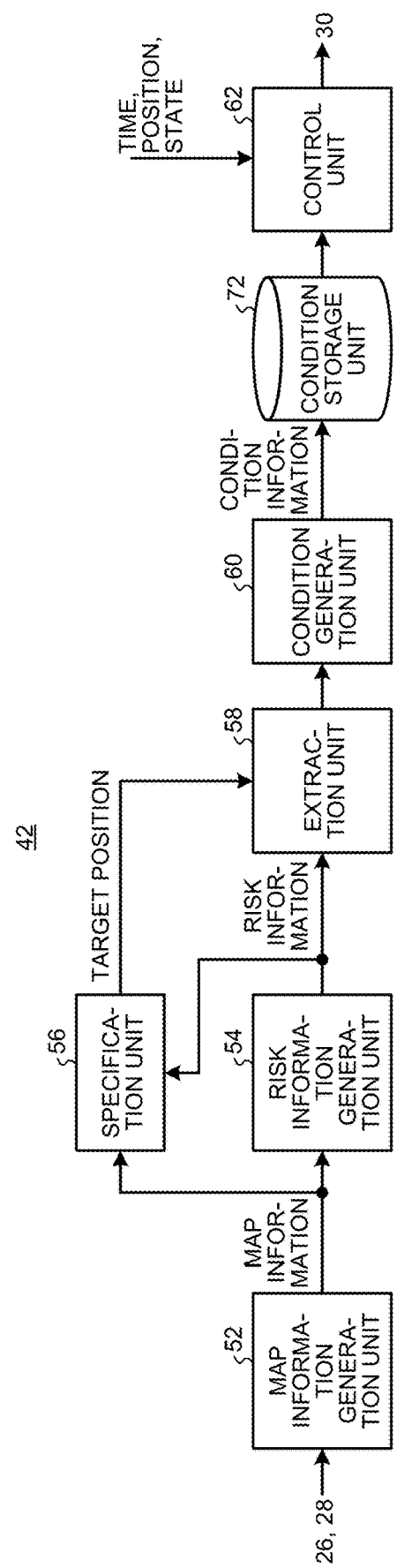
FIG. 10 is a diagram illustrating a functional configuration of the processing circuit 42 according to a first modification.

FIG. 10 is a diagram illustrating a functional configuration of the processing circuit 42 according to the first modification. The processing circuit 42 according to the first modification further includes a condition storage unit 72. The condition storage unit 72 may be included in the storage circuit 44, not in the processing circuit 42.

The condition storage unit 72 stores the condition information generated by the condition generation unit 60 for each target position.

The map information generation unit 52 generates map information at every fixed time. The specification unit 56 specifies the target position at every fixed time. The risk information generation unit 54 generates the risk information at every fixed time. The extraction unit 58 extracts the risk information of the target position at every fixed time.

The condition generation unit 60 generates new condition information at every fixed time. The condition generation unit 60 updates the condition information of a corresponding target position stored in the condition storage unit 72 based on the generated new condition information. The control unit 62 determines whether a condition indicated by the condition information stored in the condition storage unit 72 is met, and if the condition is met, the control unit 62 causes the vehicle 10 to perform the countermeasure operation.

Figure 11:
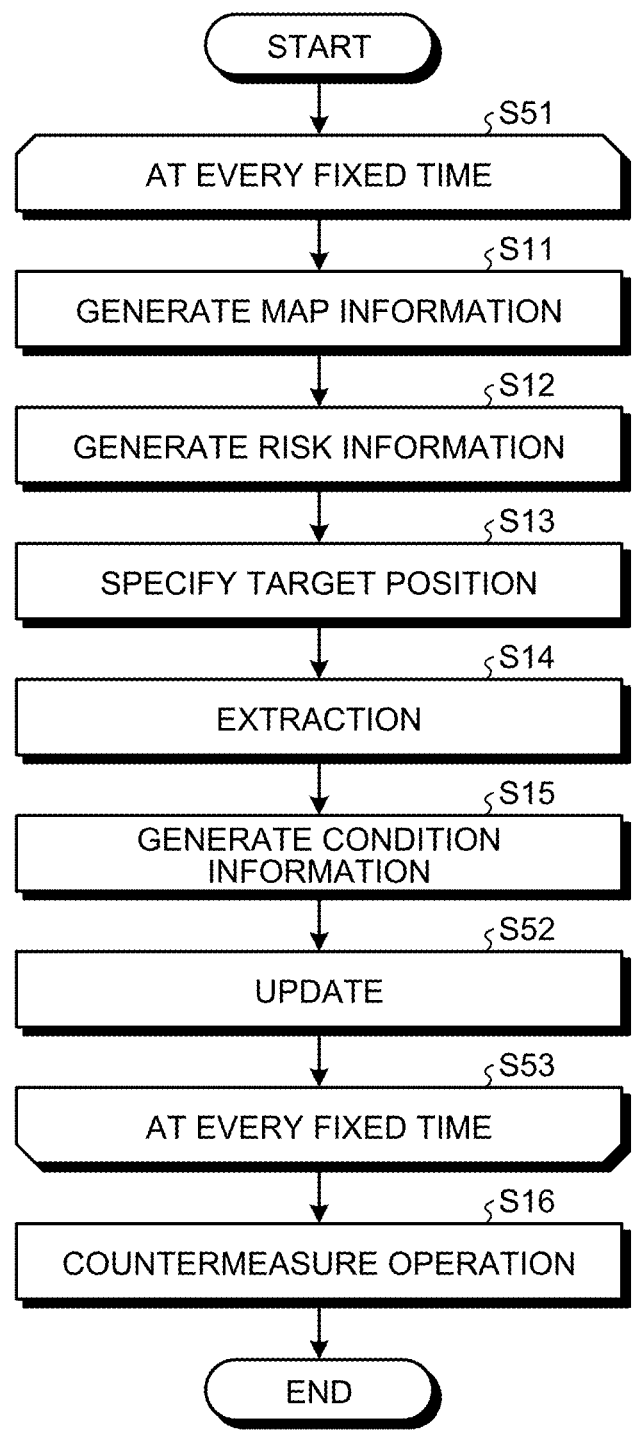
FIG. 11 is a flowchart illustrating a processing procedure of the processing circuit 42 according to the first modification.

FIG. 11 is a flowchart illustrating a processing procedure of the processing circuit 42 according to the first modification. The processing circuit 42 according to the first modification executes the process as illustrated in FIG. 11.

First, the processing circuit 42 executes the process at S11 to S52 at every fixed time (loop processing between S51 and S53).

In the loop processing, the process at S11 to S15 is the same as that described above with reference to FIG. 4. The condition generation unit 60 executes S52 subsequent to S15.

At S52, the condition generation unit 60 determines whether condition information of the same target position as that in the generated new condition information is stored in the condition storage unit 72. If the condition information of the same target position is stored therein, the condition generation unit 60 updates the condition information to the new condition information. If the condition information of the same target position is not stored therein, the condition generation unit 60 writes the new condition information in the condition storage unit 72.

At S16, the control unit 62 checks the condition information stored in the condition storage unit 72 at all times, and gives a control instruction to the vehicle control unit 30 in accordance with the condition information stored in the condition storage unit 72.

Figure 12:
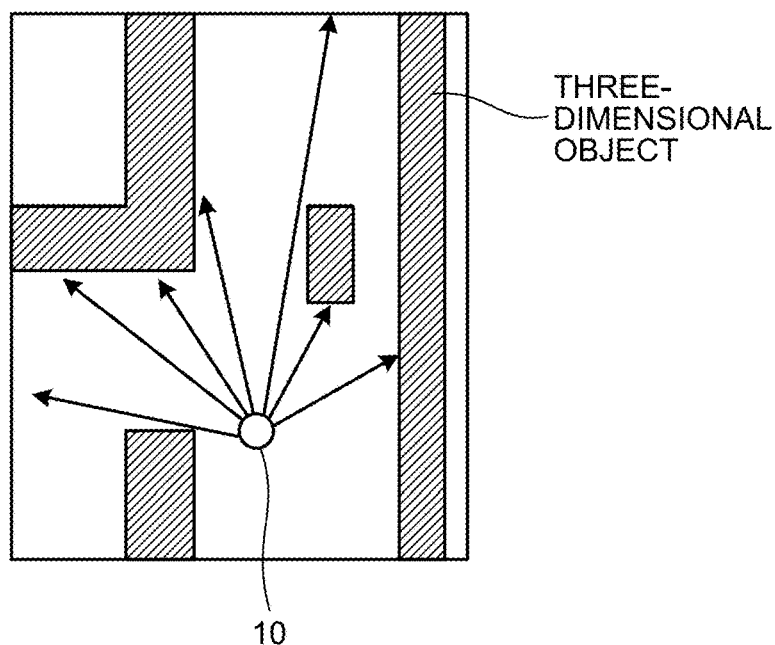
FIG. 12 is a top view of the periphery of the vehicle 10 after a certain time has elapsed from the state in FIG. 6.
Figure 13:
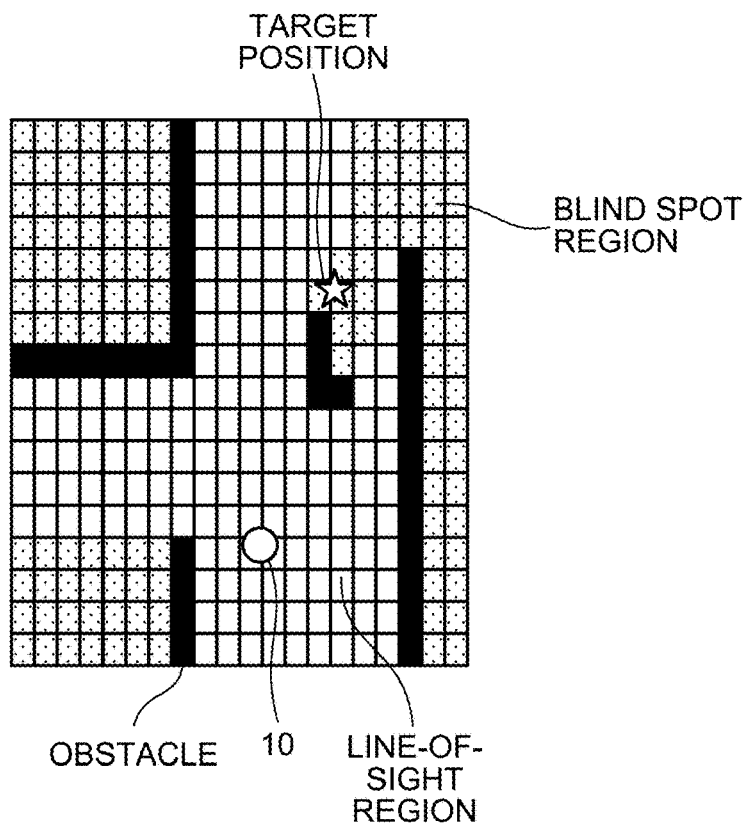
FIG. 13 is a diagram illustrating the map information after a certain time has elapsed from the state in FIG. 8.

FIG. 12 is a top view of the periphery of the vehicle 10 after a certain time has elapsed from the state in FIG. 6. FIG. 13 is a diagram illustrating the map information after a certain time has elapsed from the state in FIG. 8.

In a case in which the vehicle 10 is moving, the information processing device 20 according to the first modification generates condition information for each movement position. As illustrated in FIG. 6 and FIG. 12, the blind spot region varies depending on the movement position of the vehicle 10.

Due to this, for example, comparing the map information in FIG. 8 with the map information in FIG. 13, the map information in FIG. 13 does not include the blind spot region on the left side of the vehicle 10. That is, the target position on the left side of the vehicle 10 present at the time of FIG. 8 is not present at the time of FIG. 13.

Thus, the condition information corresponding to the target position on the left side of the vehicle 10 is not present at the time of FIG. 13. Due to this, at the time of FIG. 13, the information processing device 20 according to the first modification is not required to perform the countermeasure operation for the risk that has been present at the target position on the left side of the vehicle 10. In this way, the information processing device 20 according to the first modification can change the presence of the risk in accordance with the movement of the vehicle 10.

In the information processing device 20 according to the first modification, the risk information is updated at every fixed time. Thus, in the information processing device 20 according to the first modification, the level of the risk at the same target position may be changed for each movement position of the vehicle 10. In such a case, the information processing device 20 according to the first modification changes the condition for performing the countermeasure operation in accordance with the changed level of the risk. Estimation processing of the risk information may be performed with higher accuracy as the vehicle 10 comes closer to the target position. In this way, with the information processing device 20 according to the first modification, the level of the risk can be estimated with high accuracy in accordance with the movement of the vehicle 10.

In the above description, the information processing device 20 according to the first modification is configured to update the risk information at every fixed time, but may update the risk information every time the vehicle 10 moves by a predetermined amount. The information processing device 20 according to the first modification may update the risk information every time the surrounding environment is changed even when the vehicle 10 is stopping.

Next, the following describes a second modification.

Figure 14:
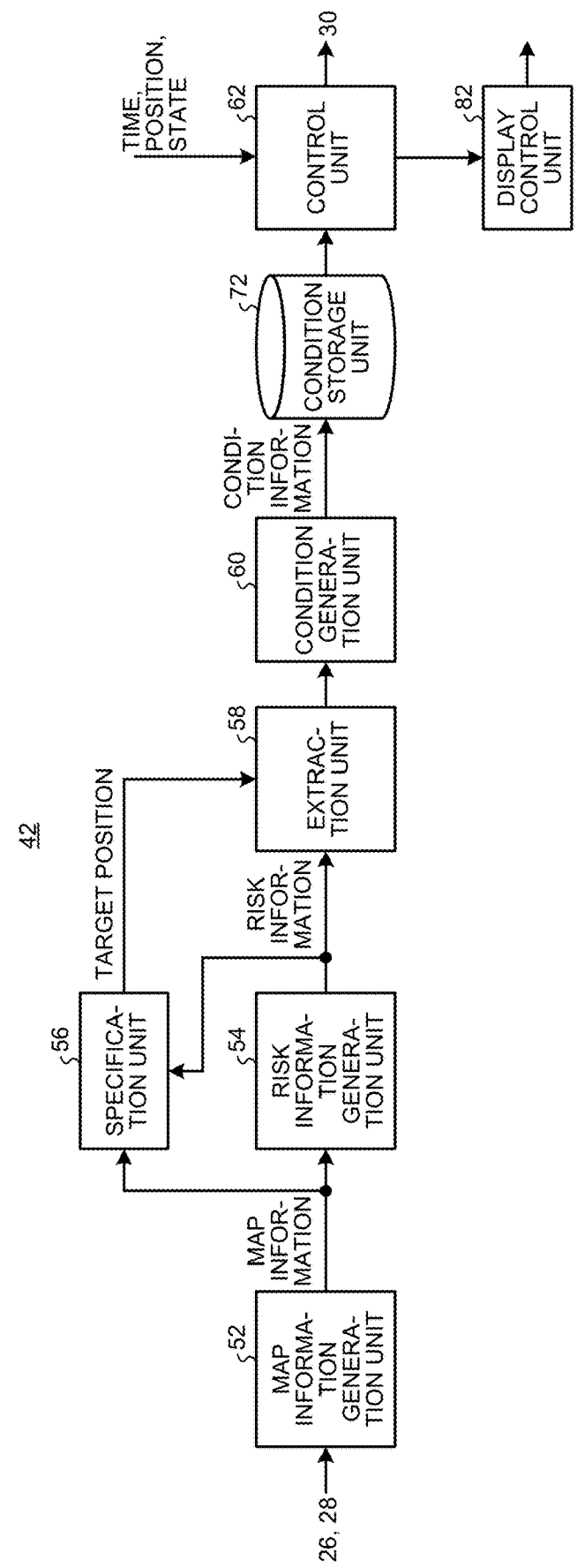
FIG. 14 is a diagram illustrating a functional configuration of the processing circuit 42 according to a second modification.

FIG. 14 is a diagram illustrating a functional configuration of the processing circuit 42 according to the second modification. The processing circuit 42 according to the second modification further includes a display control unit 82.

In a case in which the control unit 62 has performed the countermeasure operation, the display control unit 82 presents, to an occupant, the fact that the countermeasure operation for the risk has been performed. For example, in a case in which the vehicle 10 has been decelerated in accordance with the risk present in the blind spot region, the display control unit 82 causes the display unit 24 to display the fact that the vehicle 10 has been decelerated as the countermeasure operation for the risk.

For example, in a case in which the vehicle 10 has been abruptly decelerated and the reason for the deceleration is unknown, the driver (user) may feel driving is not performed normally or may perform erroneous operation. In the second modification, the display control unit 82 presents the fact that the countermeasure operation for the risk has been performed, so that the driver (user) can be prevented from feeling driving is not performed normally, or performing erroneous operation.

The processing circuit 42 may cause the display unit 24 to display the fact that the countermeasure operation for the risk has been performed, and may output the fact by voice at the same time. The processing circuit 42 may notify another device of the fact that the countermeasure operation for the risk has been performed via a network by communication.

The display control unit 82 may superimpose and display a position at which the risk is caused (for example, the target position) on an image obtained by imaging a forward direction of the vehicle 10. Due to this, the display control unit 82 can notify the driver of presence of the risk.

The display control unit 82 may superimpose the position at which the countermeasure operation is performed on the image obtained by imaging the forward direction of the vehicle 10. The display control unit 82 may also display a time at which the countermeasure operation starts to be performed. Due to this, the display control unit 82 can notify the driver of the fact that the countermeasure operation may be performed in future, and a position and a time at which the countermeasure operation may be performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device used for controlling a mobile object, comprising:
   one or more hardware processors configured to:
      generate, for each of a plurality of areas in a periphery of the mobile object, risk information indicating a level of a risk based at least in part on map information for identifying an obstacle and whether each of the plurality of areas are within a line-of-sight region that is not hidden by the obstacle when viewed from the mobile object or within a blind spot region that is present within or behind the obstacle when viewed from the mobile object, the level of the risk being based on a possibility that the object runs out from the blind spot region to have a collision with the mobile object;
      estimate, for each of the plurality of areas, a probability that an area is flat or a plane having a same height as a height of a road surface in the blind spot region to generate the risk information indicating a higher level of the risk for the area at which the estimated probability is higher;
      specify, from among the plurality of areas, an area at which the level of the risk is equal to or higher than a threshold as a target area and a countermeasure operation needs to be performed;
      generate condition information indicating a condition for performing a countermeasure operation in accordance with the risk information at the target area;
      determine whether the condition indicated by the condition information is met; and
      cause the mobile object to perform the countermeasure operation when the condition is met.

2. The device according to claim 1, wherein the one or more processors are configured to estimate, for each of the plurality of areas, an obstacle presence probability in the blind spot region to generate the risk information indicating a higher level of the risk for an area at which the estimated obstacle presence probability is smaller.

3. The device according to claim 2, wherein the one or more processors are configured to generate the condition information indicating a time at which the countermeasure operation is to be performed.

4. The device according to claim 3, wherein the one or more processors are configured to generate the condition information for causing the countermeasure operation to be performed at an earlier time as a risk is higher.

5. The device according to claim 2, wherein the one or more processors are configured to specify, from among the plurality of areas and as the target area, an area that is adjacent to the line-of-sight region, the risk information of the area comprising the level of the risk at a particular level or higher.

6. The device according to claim 2, wherein the one or more processors are configured to generate the condition information for causing the countermeasure operation to be performed at a position farther from the target area when the level of the risk is higher.

7. The device according to claim 2, further comprising:
   a condition memory configured to store the condition information, wherein the one or more processors are configured to:
      generate the risk information at every fixed time;
      generate new condition information at the every fixed time;
      update the condition information stored in the condition memory and corresponding to the target area;
      determine whether the condition indicated by the condition information stored in the condition memory is met; and
      cause the mobile object to perform the countermeasure operation when the condition is met.

8. An information processing device used for controlling a mobile object, comprising:
   one or more hardware processors configured to:
      generate, for each of a plurality of areas in a periphery of the mobile object, risk information indicating content and a level of a risk that is caused when the mobile object moves based at least in part on map information for identifying an obstacle and whether each of the plurality of areas are within a line-of-sight region that is not hidden by the obstacle when viewed from the mobile object or within a blind spot region that is present within or behind the obstacle when viewed from the mobile object, the level of the risk being based on a possibility that the object runs out from the blind spot region to have a collision with the mobile object;

estimate, for each of the plurality of areas, a probability that an area is flat or a plane having a same height as a height of a road surface in the blind spot region to generate the risk information indicating a higher level of the risk for the area at which the estimated probability is higher;

specify, from among the plurality of areas, an area at which the level of the risk is equal to or higher than a threshold as a target area and a countermeasure operation needs to be performed;

generate condition information indicating a condition for performing a countermeasure operation in accordance with the risk information at the target area;

determine whether the condition indicated by the condition information is met; and cause the mobile object to perform the countermeasure operation when the condition is met.

9. An information processing device used for controlling a vehicle, comprising:

one or more hardware processors configured to:

generate, for each of a plurality of areas in a periphery of the vehicle, risk information indicating a level of a risk based at least in part on map information for identifying an obstacle and whether each of the plurality of areas are within a line-of-sight region that is not hidden by the obstacle when viewed from the vehicle or within a blind spot region that is present within or behind the obstacle when viewed from the vehicle, the level of the risk being based on a possibility that the object runs out from the blind spot region to have a collision with the vehicle;

estimate, for each of the plurality of areas, a probability that an area is flat or a plane having a same height as a height of a road surface in the blind spot region to generate the risk information indicating a higher level of the risk for the area at which the estimated probability is higher;

specify, from among the plurality of areas, an area at which the level of the risk is equal to or higher than a threshold as a target area and a countermeasure operation needs to be performed;

generate condition information indicating a condition for performing a countermeasure operation in accordance with the risk information at the target area;

determine whether the condition indicated by the condition information is met; and cause the vehicle to perform the countermeasure operation when the condition is met.

10. The device according to claim 9, wherein the one or more processors are configured to decelerate the vehicle when the condition is met.

11. The device according to claim 9, wherein the one or more processors are configured to change a moving direction of the vehicle when the condition is met.

12. The device according to claim 9, wherein the one or more processors are further configured to indicate, to an occupant of the vehicle, that the countermeasure operation has been performed when the countermeasure operation has been performed.

13. A mobile object control method for controlling a mobile object, comprising:

generating, for each of a plurality of areas in a periphery of the mobile object, risk information indicating a level of a risk based at least in part on map information for identifying an obstacle and whether each of the plurality of areas are within a line-of-sight region that is not hidden by the obstacle when viewed from the mobile object or within a blind spot region that is present within or behind the obstacle when viewed from the mobile object, the level of the risk being based on a possibility that the object runs out from the blind spot region to have a collision with the mobile object;

estimating, for each of the plurality of areas, a probability that an area is flat or a plane having a same height as a height of a road surface in the blind spot region to generate the risk information indicating a higher level of the risk for the area at which the estimated probability is higher;

specifying, from among the plurality of areas, an area at which the level of the risk is equal to or higher than a threshold as a target area and a countermeasure operation needs to be performed;

generating condition information indicating a condition for performing a countermeasure operation in accordance with the risk information at the target area; and determining whether the condition indicated by the condition information is met, and causing the mobile object to perform the countermeasure operation when the condition is met.

* * * * *